United States Patent [19]

Shi

[11] Patent Number: 5,774,991
[45] Date of Patent: Jul. 7, 1998

[54] GARDENING SHEARS

[76] Inventor: Jun-Chen Shi, 58, Ma Yuan West St., Taichung, Taiwan

[21] Appl. No.: 654,035

[22] Filed: May 28, 1996

[51] Int. Cl.⁶ ........................................... B26B 13/16
[52] U.S. Cl. ........................................... 30/262; 30/254
[58] Field of Search ........................ 30/254, 261, 262; 81/321, 324

[56] References Cited

U.S. PATENT DOCUMENTS

| 2,189,211 | 2/1940 | Lind | 30/262 |
| 2,495,677 | 1/1950 | Boyer | 30/262 X |
| 3,339,281 | 9/1967 | Chow | 30/262 |
| 3,775,846 | 12/1973 | Johnson | 30/262 |
| 4,567,656 | 2/1986 | Wallace et al. | 30/262 |
| 4,980,975 | 1/1991 | Hodson | 30/262 |
| 5,426,857 | 6/1995 | Linden | 30/262 |

FOREIGN PATENT DOCUMENTS

| 45505 | 10/1967 | Germany | 30/262 |
| 23 63 445 | 6/1975 | Germany | 30/262 |
| 2610650 | 9/1976 | Germany | 30/262 |
| 533355 | 10/1976 | U.S.S.R. | 30/262 |
| 724104 | 3/1980 | U.S.S.R. | 30/262 |
| 1380672 | 3/1988 | U.S.S.R. | 30/262 |
| 2030502 | 4/1980 | United Kingdom | 30/262 |

*Primary Examiner*—Maurina T. Rachuba

[57] ABSTRACT

A pair of shears comprises a first blade connecting to a first grip and a second blade connecting to a second grip. A first notch is formed at the bottom of the first blade. A second notch is formed at the bottom of the second blade. A round hole is formed on the front portion of the first grip. A tongue is positioned on the upper surface of the front portion of the first grip. The positioning device has at least a first hole to receive a first pivot and a second hole to receive a second pivot. A first and second recesses are formed in the upper inner periphery of the positioning device. An opening is formed in the positioning device to receive the front portion of the first grip. The first pivot passes through the first hole and the round hole to fasten the positioning device and the first grip pivotally.

2 Claims, 4 Drawing Sheets

5,774,991

GARDENING SHEARS

BACKGROUND OF THE INVENTION

The invention relates to a pair of gardening shears. More particularly, the invention relates to a positioning device of a pair of gardening shears.

Referring to FIGS. 1 and 2, a pair of conventional shears has a first blade 2 connecting to a first handle 20 and a second blade 3 connecting to a second handle 30. A joint 300 is disposed between the second blade 3 and the second handle 30. The joint 300 has a notch 301 thereon. A block plate 1 is disposed on the front portion of the first handle 20. After the first handle 20 is pressed toward the second handle 30, the block plate 1 can be rotated until the block plate 1 abuts the notch 301 of the joint 300. Since the block plate 1 is fastened on the first handle 20 tightly with a bolt, it is difficult to rotate the block plate 1. After a long period of usage, the bolt will be loosened. Thus the block plate 1 can be rotated freely and will become useless. Therefore, the first blade 2 and the second blade 3 may not be engaged with each other smoothly.

SUMMARY OF THE INVENTION

An object of the invention is to provide a pair of gardening shears which has a positioning device for allowing the smooth engagement between the first blade and the second blade.

Another object of the invention is to provide a pair of gardening shears which has a front portion of the first grip as a seat for receiving the positioning device.

Accordingly, a pair of shears comprises a first blade connecting to a first grip and a second blade connecting to a second grip. A first notch is formed at the bottom of the first blade. A second notch is formed at the bottom of the second blade. The first notch matches the second notch while the first blade engages with the second blade. The perimeter of a front portion of the first grip is smaller than the perimeter of the middle portion of the first grip. A round hole is formed on the front portion of the first grip. A tongue is positioned on the upper surface of the front portion of the first grip. A lower bevel and an upper bevel are formed on the front surface of the middle portion of the first grip. The positioning device has at least a first hole to receive a first pivot and a second hole to receive a rod. A first and a second recesses are formed in the upper inner periphery of the positioning device. An opening is formed in the positioning device to receive the front portion of the first grip. The first pivot passes through the first hole and the round hole to fasten the positioning device and the first grip pivotally. The positioning device is rotated until the tongue touches the second recess. Therefore, the rod disengages from the first notch and the second notch. The positioning device abuts the lower bevel. Thus the first blade disengages from the second blade. Then the second grip is pressed toward the first grip. The first notch matches the second notch. The positioning device is rotated toward the first notch and the second notch until the rod is inserted in the corresponding notches. The tongue touches the first recess. The positioning device abuts the upper bevel. Thus the first blade engages with the second blade.

DETAILED DESCRIPTION OF THE INVENTION

Figure 1:
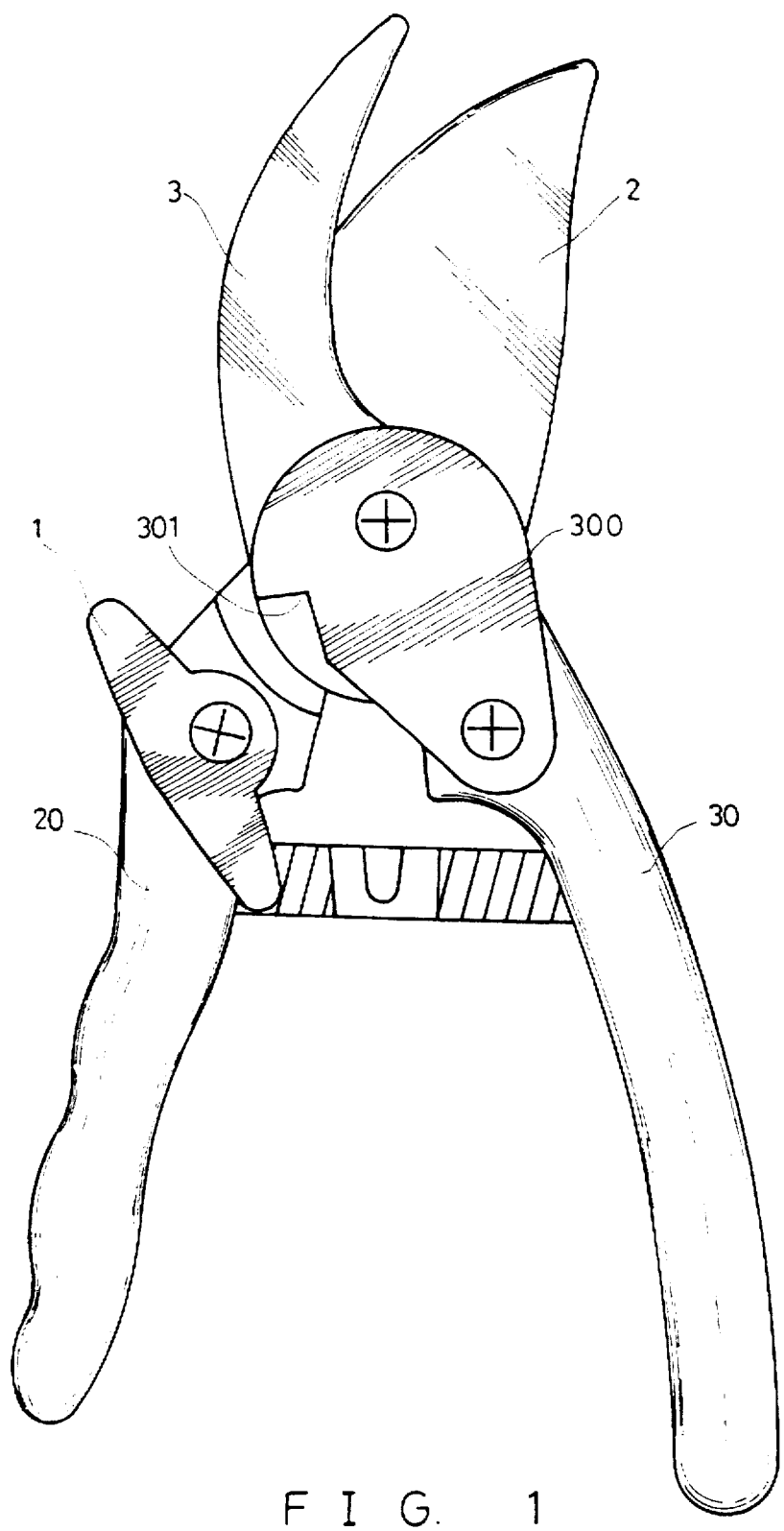
FIG. 1 is an elevational view of a pair of conventional shears of the prior art while the first blade engages with the second blade.
Figure 2:
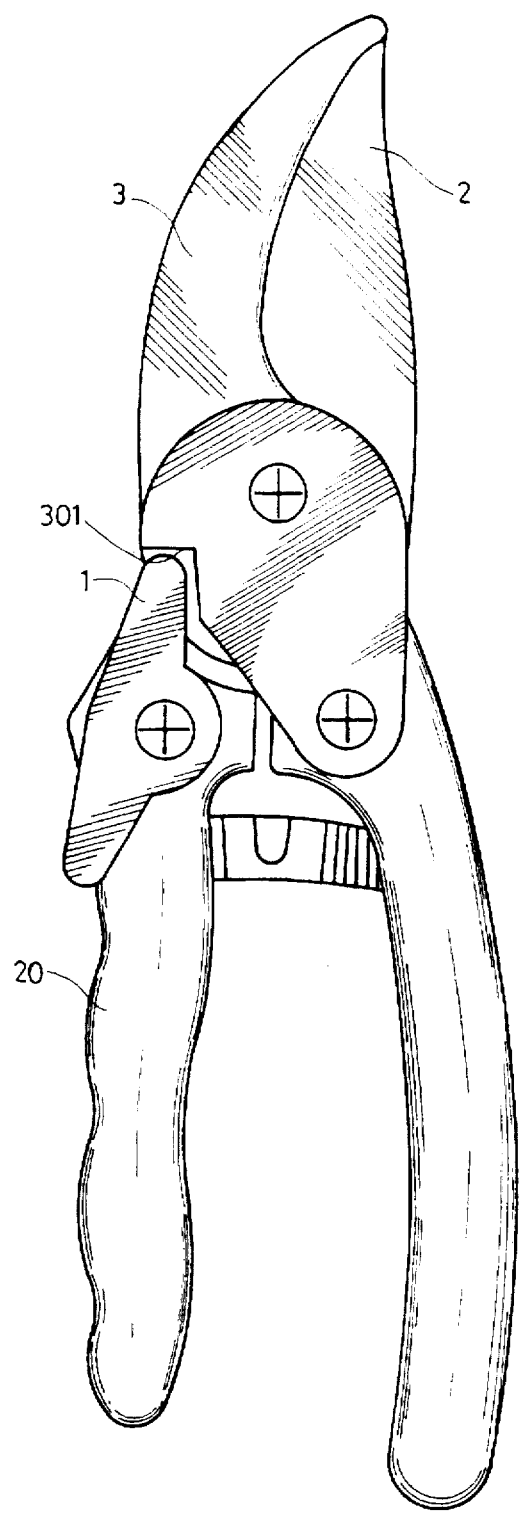
FIG. 2 is an elevational view of a pair of conventional shears of the prior art while the first blade disengages with the second blade.
Figure 3:
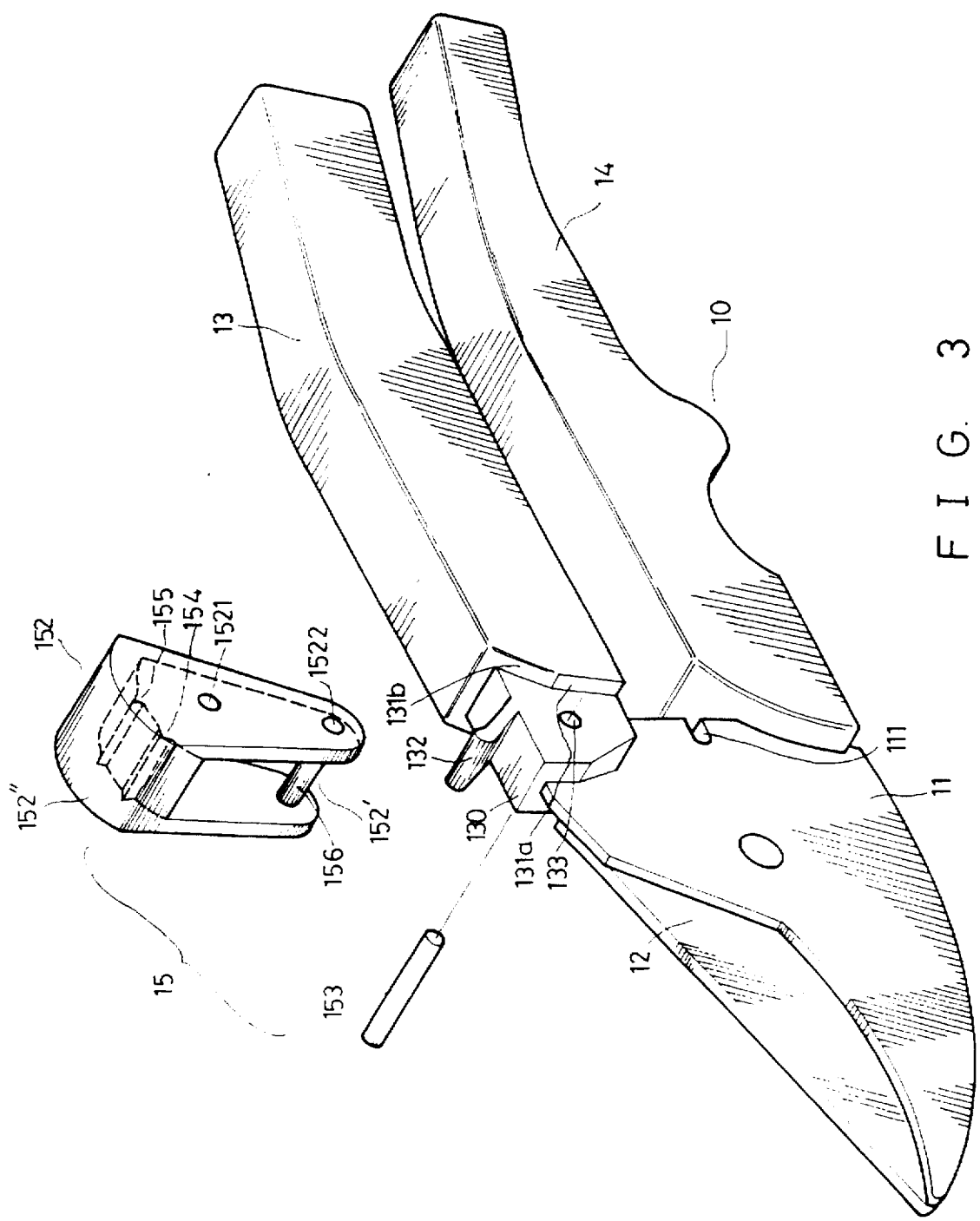
FIG. 3 is a partially perspective exploded view of a pair of gardening shears of a preferred embodiment in accordance with the invention.
Figure 4:
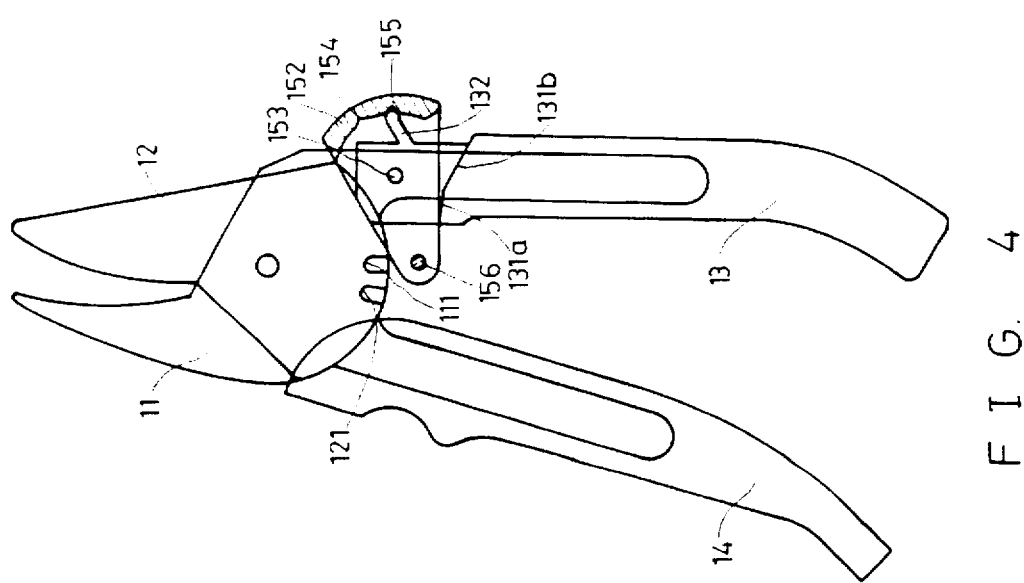

Referring to FIGS. 3 and 4, a pair of shears 10 comprises a first blade 11 connecting to a first grip 13 and a second blade 12 connecting to a second grip 14. A first notch 111 is formed at the bottom of the first blade 11. A second notch 121 is formed at the bottom of the second blade 12. The first notch 111 matches the second notch 121 while the first blade 11 engages with the second blade 12. The perimeter of a front portion 130 of the first grip 13 is smaller than the perimeter of the middle portion of the first grip 13. A round hole 133 is formed on the front portion 130 of the first grip 13. A tongue 132 is positioned on the upper surface of the front portion 130 of the first grip 13. A lower bevel 131a and an upper bevel 131b are formed on the front surface of the middle portion of the first grip 13. The positioning device 15 has at least a first hole 1521 to receive a first pivot 153 and a second hole 1522 to receive a rod 156. A first and a second recesses 154 and 155 are formed in the upper inner periphery 152" of the positioning device 15. An opening 152' is formed in the positioning device 15 to receive the front portion 130 of the first grip 13. The first pivot 153 passes through the first hole 1521 and the round hole 133 to fasten the positioning device 15 and the first grip 13 pivotally.

Referring to FIG. 4, the positioning device 15 is rotated until the tongue 132 touches the second recess 155. Therefore, the rod 156 disengages from the first notch 111 and the second notch 121. The positioning device 15 abuts the lower bevel 131a. Thus the first blade 11 disengages from the second blade 12.

Figure 6:
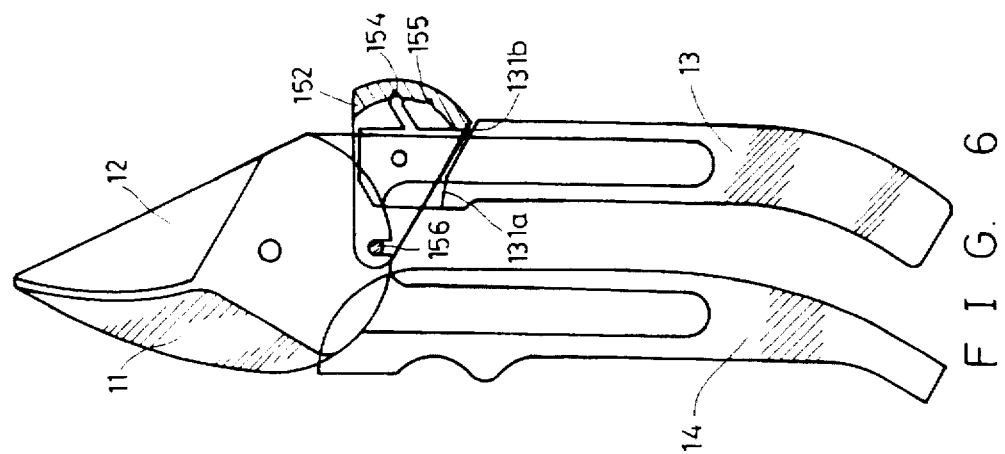
FIGS. 4, 5 and 6 are elevational views illustrating the operation of a pair of gardening shears of a preferred embodiment in accordance with the invention.
Figure 5:
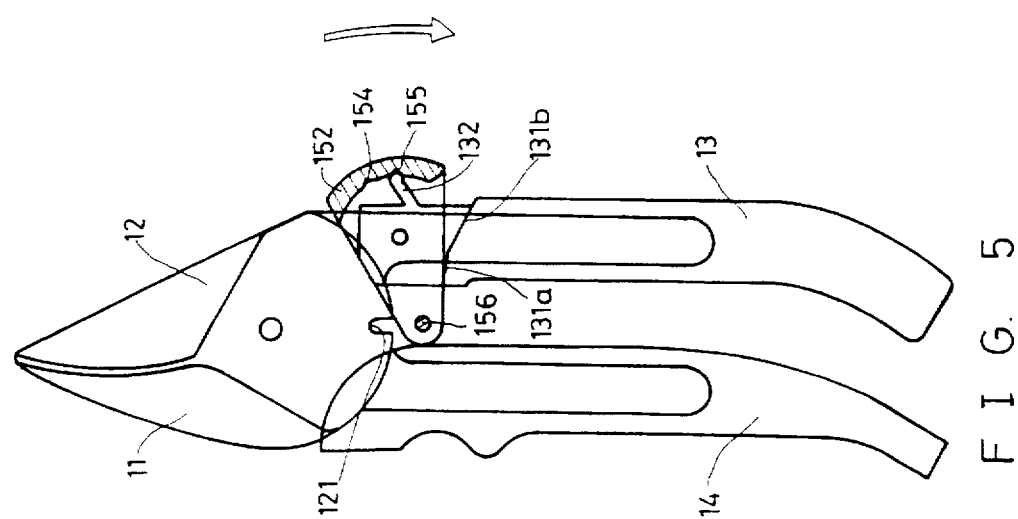

Referring to FIGS. 5 and 6, the second grip 14 is pressed toward the first grip 13. The first notch 111 matches the second notch 121. The positioning device 15 is rotated toward the first notch 111 and the second notch 121 until the rod 156 is inserted in the corresponding notches 111 and 121. The tongue 132 touches the first recess 154. The positioning device 15 abuts the upper bevel 131b. Thus the first blade 11 engages with the second blade 12.

The arrangement among the positioning device 15, the first and second notches 111 and 121, and the tongue 132 will allow the smooth engagement between the first blade 11 and the second blade 12. Therefore, the disadvantages of the conventional shears are eliminated according to the arrangement of the structures of the invention.

The invention is not limited to the above embodiment but various modification thereof may be made. It will be understood by those skilled in the art that various changes in form and detail may be made without departing from the scope of the invention.

I claim:

1. A pair of shears comprising:

a first blade connecting to a first grip;

a second blade connecting to a second grip;

a first notch formed at a bottom of said first blade;

a second notch formed at a bottom of said second blade;

a round hole formed on a front portion of said first grip;

a tongue positioned on an upper surface of said front portion of said first grip;

a lower bevel and an upper bevel formed on a front surface of a middle portion of said first grip;

a positioning device having at least a first hole to receive a first pivot and a second hole to receive a rod;

a first and a second recesses formed in an upper inner periphery of said positioning device;

an opening formed in said positioning device to receive said front portion of said first grip;

said first pivot passing through said first hole and said round hole to fasten said positioning device and said first grip pivotally;

wherein said positioning device is rotated until said tongue touches said second recess, said rod disengages from said first notch and said second notch, said positioning device abuts said lower bevel, and said first blade and said second blade are opened;

wherein said second grip is pressed toward said first grip until said first notch matches said second notch, said positioning device is rotated toward said first notch and said second notch until said rod is inserted in said first notch and said second notch, said tongue touches said first recess, said positioning device abuts said upper bevel, and said first blade and said second blade are closed.

2. A pair of shears as claimed in claim 1, wherein a perimeter of said front portion of said first grip is smaller than a perimeter of said middle portion of said first grip.

* * * * *